April 20, 1965 L. J. WUBBE 3,178,751
WINDSHIELD WIPER ARM
Filed Feb. 4, 1963 3 Sheets-Sheet 1
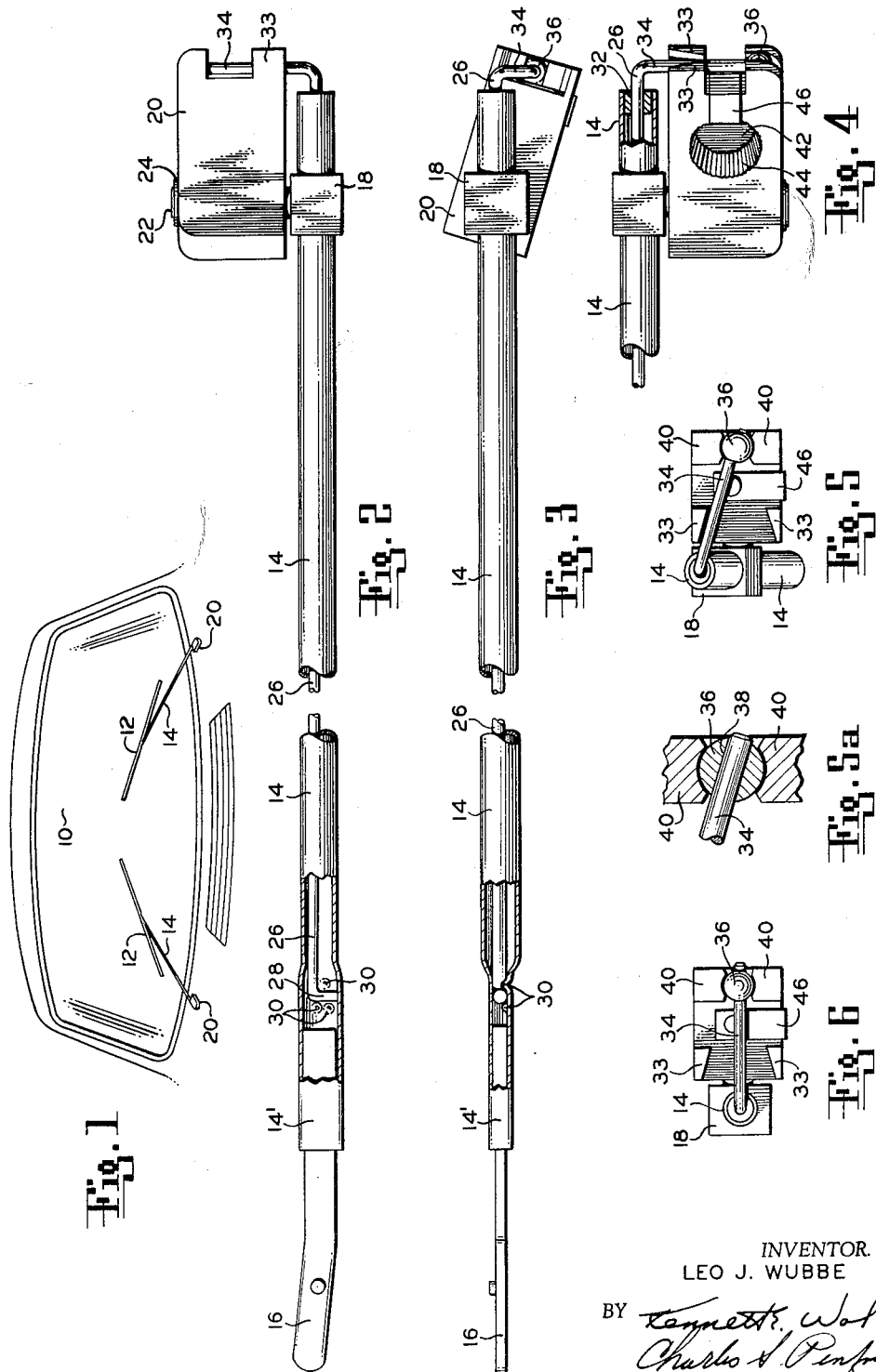
INVENTOR.
LEO J. WUBBE
BY
ATTORNEYS

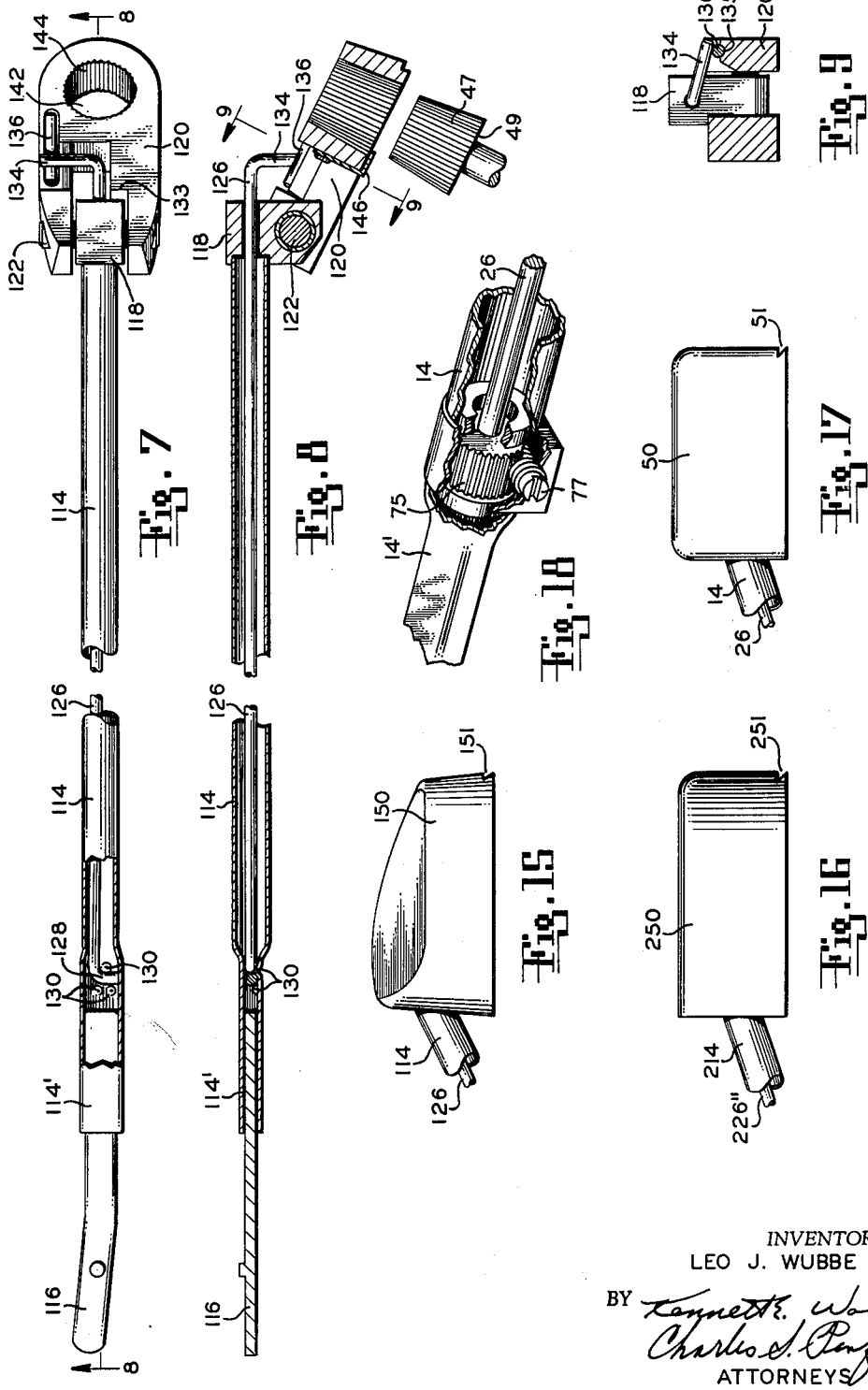

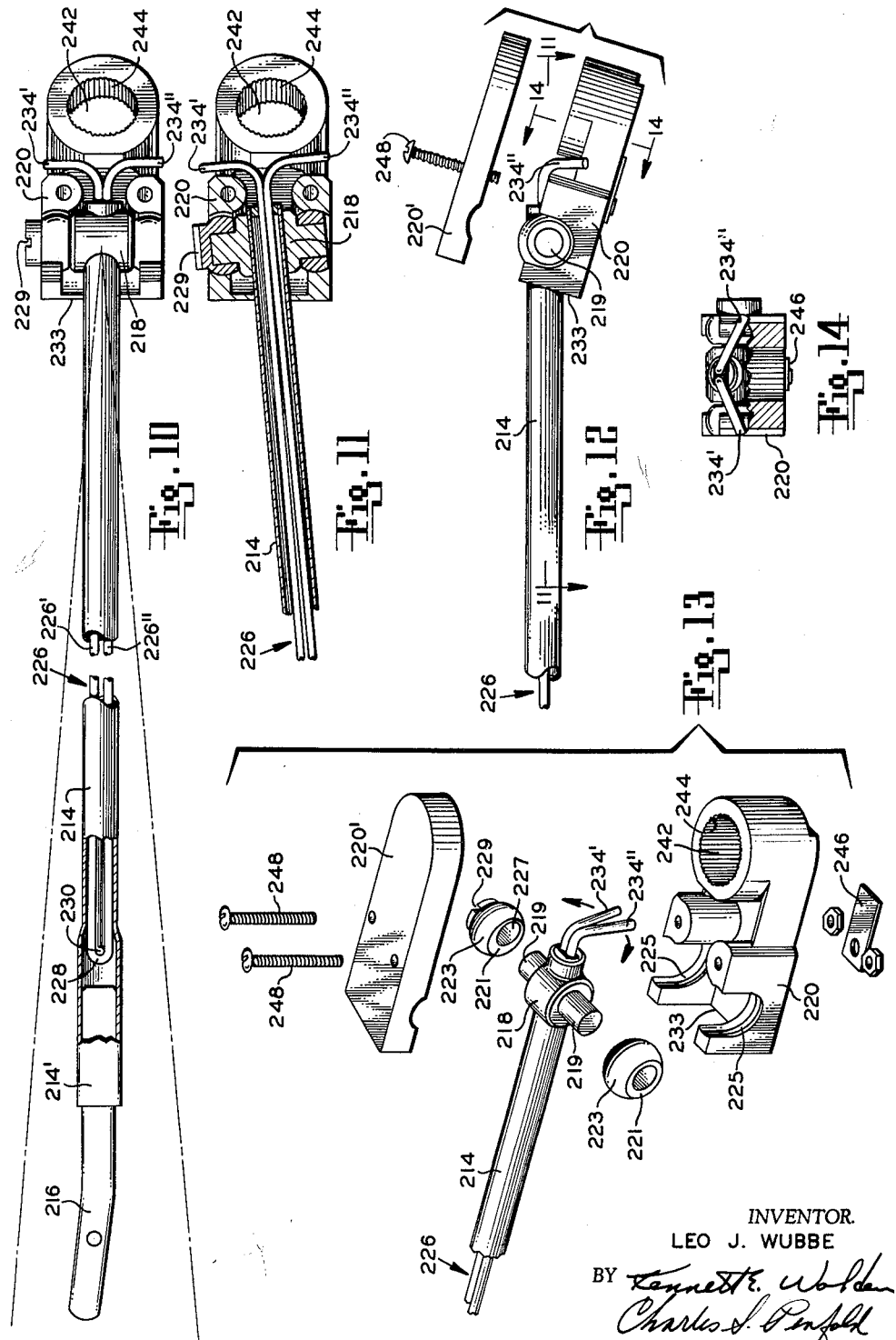

United States Patent Office 3,178,751
Patented Apr. 20, 1965

3,178,751
WINDSHIELD WIPER ARM
Leo J. Wubbe, Beverly Shores, Ind., assignor to The
Anderson Company, a corporation of Indiana
Filed Feb. 4, 1963, Ser. No. 255,853
9 Claims. (Cl. 15—250.35)

This invention relates to windshield wiper arms and particularly to structure for resiliently urging an outer portion of a wiper-carrying arm toward a windshield.

The prior art discloses, for example in Patent No. 3,064,297, issued November 20, 1962, a windshield wiper arm for carrying a wiper blade in an oscillatory path over a windshield. The arm is comprised of a head adapted to be operably received on a pivot shaft and having an extension or outer arm directed radially from the head for carrying the wiping blade. The head and blade-carrying outer arm are pivotally connected to permit relative movement as the blade traverses the curvature of the windshield and to permit the arm to be lifted from the windshield. A tension spring is provided with this arrangement, with opposite ends anchored respectively to the head and outer arm, for urging the outer arm and the wiper, which it carries, onto the windshield. Provisions are shown for changing the bias applied by the tension spring.

The present invention employs a head or inner section hingedly carrying an outer arm or section with a torsion bar disposed within the outer arm and generally coaxial and coextensive therewith. The bar has its outer end anchored to or fixedly received on the arm in nonrotative relationship and has a lateral portion on its inner end adapted to actively bear against a portion of the head. During assembly, torque energy is stored in the bar so that the head and outer arm are relatively biased. When the head is received in operative position on a pivot shaft, the torque bar urges the outer arm toward a windshield for holding a wiper blade normally carried thereby against the windshield.

An object of this invention is to provide an improved windshield wiper arm.

Another object of this invention is to provide an improved windshield wiper arm employing a torque bar.

Another object of this invention is to provide an improved windshield wiper employing torque bar means and having unique means for anchoring the bar.

Another object of this invention relates to means for changing the tension of the torque bar.

Another object of this invention is to provide an improved windshield wiper arm providing an arrangement for varying the lateral angular relationship of the arm relative to the pivot head.

FIGURE 1 shows a windshield with arms and wipers in position thereon.

FIGURE 2 is a top view, partly in cut-away, of one form of the wiper arm.

FIGURE 3 is a side view of FIGURE 2 partly in cut-away.

FIGURE 4 is a bottom view of the head end of the arm shown in FIGURES 2 and 3.

FIGURE 5 is an end view of FIGURES 2 and 3.

FIGURE 5A is an enlarged sectional view of a detail of FIGURE 5.

FIGURE 6 is an end view of FIGURES 2 and 3, similar to FIGURE 5, but showing the biased arm in a second position.

FIGURE 7 is a top view of a similar wiper arm showing a second form of the head.

FIGURE 8 is a sectional view of FIGURE 7 taken along line 8—8.

FIGURE 9 is a sectional view of FIGURE 8 taken along line 9—9.

FIGURE 10 is a plan view showing a third form of the invention.

FIGURE 11 is a sectional plan view of the structure of FIGURE 10 and showing parts in different relative positions.

FIGURE 12 is a side view of FIGURE 10 with a cover spaced therefrom.

FIGURE 13 is an exploded view of the elements shown in FIGURES 10, 11 and 12.

FIGURE 14 is a sectional view taken along line 14—14 of FIGURE 12.

FIGURE 15 shows a cover for the structure of FIGURE 7.

FIGURE 16 shows a cover for the structure of FIGURE 10.

FIGURE 17 shows a cover for the structure of FIGURE 2.

FIGURE 18 is an enlarged cut-away view of structure for varying the torsional load on the torque bar.

In the general arrangement of FIGURE 1, a windshield 10 is shown with wipers 12 and arms 14 in position thereon.

In FIGURES 1–6, an arm 14 is pivotally or hingedly connected to a head 20 for relative movement therewith. An outer extremity or flat end 16 of arm 14 is adapted for receiving a connector on a windshield wiper. The connector is not shown in this disclosure but may be of the type shown in U.S. Patent No. 3,071,798, issued January 8, 1963. More specifically, arm 14 is fixedly carried by a block 18 which is provided with a transverse pin 22 for extending through an opening in head 20 in hinged pivotal relationship therewith. A snap ring 24 retains pin 22 in assembled relationship with head 20. Arm 14 is generally tubular throughout a major portion of its length and is flattened or otherwise deformed at its outer end 14' for receiving and fixedly maintaining flat end 16 in position as clearly shown in FIGURES 2 and 3. Head 20, when operatively received on a pivot shaft, carries outer arm 14 in an arcuate path of movement across a windshield. The arm is permitted to pivot by the connection above mentioned, toward and away from the windshield during such movement to adapt itself to or seek its position on a normally irregular or curved surface.

An elongate torque or torsion bar 26 is disposed within tubular arm 14 and generally coextensive and coaxial therewith for a substantial portion of its length. Outer end 28 of torsion bar 26, as shown in FIGURE 2, is disposed at an angle to the main body of the bar so that it may be more readily retained in nonrotative and fixed relationship with respect to tubular arm 14. As shown in FIGURE 3, end 28 is retained in the deformed or flattened outer portion 14' of arm 14. Dimples 30, formed in portion 14' adjacent end 28, aid in retaining torsion bar 26 in the desired position within arm 14. It is envisioned that other arrangements may be used for effectively anchoring an outer end of torsion bar 26 to arm 14 without departing from the general idea herein shown and described. An arrangement for adjustably holding bar 26 will be hereinafter fully disclosed.

A sleeve 32 is carried within the inner extremity of arm 14 for freely receiving torsion bar 26 to maintain its generally in concentric relationship where the bar projects from the arm. Sleeve 32 additionally permits torsional displacement of torsion bar 26 therethrough.

The inner end of torsion bar 26 which protrudes outside tubular arm 14 is provided with a laterally or angularly offset portion 34 as shown in FIGURES 4, 5 and 6. Offset portion 34 terminates adjacent and resiliently bears against an opposite side of head 20 from arm 14. A spherical bearing member 36 is provided with an opening 38 through its diameter for slidably receiving portion 34. As shown in FIGURES 5 and 5A, the bearing member is pivotally received in bearing relationship on seats 40 of head 20.

Arm 14 is pivotally or hingedly connected to head 20 so that the wiper-carrying end 16 can be moved toward and away from a windshield over which it is oscillated. As viewed in FIGURE 3, torsion bar 26 normally urges arm 14 counterclockwise about pin 22. Torsion bar 26 provides the necessary action to resiliently urge end 16 of the outer arm in a path or plane of movement toward the windshield. As previously mentioned, torsion bar 26 is fixedly anchored at one end 28 to portion 14' of arm 14. During assembly of arm 14 and head 20, torsion bar 26 is preloaded about its longitudinal axis to a predetermined angular position by twisting portion 34 counterclockwise as viewed in FIGURE 5. The extremity of portion 34 is received in spherical member 36 which is contained in seats 40 located at the rear of head 20. It will be understood that the torsional reaction on this seat created by the stored energy in bar 26 causes the outer end 16 of arm 14 to be resiliently urged toward a windshield. The output potential of torsion bar 26 depends upon its size, internal characteristics and the amount of energy stored therein.

The underneath portion of head 20, as shown in FIGURE 4, is provided with a recess 42 having splines 44 on its wall. Recess 42 is adapted to be operatively received over a drum head 47 of the pivot shaft (typically shown in FIGURE 8).

Retainer 46, preferably in the form of an anchored cantilevered resilient latch, overhangs a portion of recess 42 and is adapted to catch behind the shoulders 49 of drum head 47 for retaining head 20 in position thereon. Means, other than here disclosed, may be used for attaching head 20 to a pivot shaft for this and the other species of FIGURES 7–18.

The disclosure of the arm and head in FIGURES 2 and 3 is asymmetrical and it is anticipated that a mirror image may be preferred for use in pairs on opposite sides of a windshield. This would obviously necessitate the reversal of certain elements and involve procedures clearly within the skill of the artisan.

FIGURES 7, 8 and 9 disclose a second form of my invention which will now be fully described.

Since the outer arm 114, as disclosed in FIGURES 7 and 8, is substantially identical to that disclosed in FIGURES 2 and 3, relating numerals in the hundred series will be applied to similar parts, and the description thereof abbreviated.

Tubular arm 114 is fixedly received in block 118 which in turn is pivotally retained by pins 122 on bifurcated head 120. Recess 142 is provided in head 120 with splines 144 on the surface thereof. Splines 144 are adapted to cooperate with a splined drum head 47 provided on a pivot shaft. Resilient retainer 146 is anchored at one part to head 120 and has another part which resiliently overlies opening 142 for connection with shoulder 49 of drum head 47 to maintain head 120 in operative position thereon.

Torsion bar 126, similar to torsion bar 26 previously described, is substantially carried within tubular arm 114 and is fixedly anchored thereto at outer end 128 only. The inner end of torsion bar 126 freely extends through block 118 and terminates in a laterally projecting portion 134. As set forth in the description of the structure of FIGURES 1 through 6, energy is stored in torsion bar 126 by turning the laterally projecting portion 134 counterclockwise a predetermined amount to resiliently distort the bar 126 about its elongate axis. When portion 134 is permitted to resiliently bear on a side portion of head 120, it is obvious that a downward force will be applied to the outer end of arm 114. In other words, arm 114 tends to pivot counterclockwise about pin 122 when viewed in FIGURE 8. Cylindrical recess 135 is provided on one side of head 120 for receiving a roller 136. In FIGURES 7 and 9, it is shown that lateral portion 134 of torsion bar 126 rests or bears on roller 136 and will cause rolling action of roller 136 during relative pivotal movement between arm 114 and head 120. Friction between the moving parts is thereby lessened to the greater effectiveness of torsion bar 126.

During assembly of arm 114 and head 120, torsion bar 126 is twisted or otherwise resiliently angularly distorted about its elongate axis by moving portion 134 counterclockwise a predetermined angular amount. Since the extremity of portion 134 bears on roller 136, the force thereon causes outer end 116 of outer arm 114 to be reactively resiliently urged toward a windshield. Again, the output of bar 126 depends upon the torsional energy stored therein. The capacity of torsion bar 126 depends upon its size, design and internal characteristics.

A third form of this invention is disclosed in FIGURES 10 through 14 wherein tubular arm 214, including a wiper-receiving part 216, is pivotally carried by head 220. Outer end 214' of arm 214 is flattened or otherwise deformed to fixedly retain end 216, and the inner end is fixedly received in block 218 which, in turn, is pivotally mounted on head 220. Trunnions 219, projecting from opposite sides of block 218, are each received by bearing 221. Bearings 221 have outer spherical surfaces 223 which are adapted to be received in recesses 225 on head 220. It will be noted that recesses 225 include spherical surfaces for matching spherical surfaces 223.

As shown in FIGURE 11 and exploded FIGURE 13, one of the bearings 221 has an eccentrically disposed inner sleeve 227. It will be understood, after viewing FIGURES 10 and 11, that this particular bearing is provided with a tool slot 229 for receiving a screw driver, or the like, to facilitate manual turning of the one bearing to a position to vary the angular position of block 218 and arm 214 with respect to head 220. This permits the parking position of the wiper arm to be easily adjusted within a predetermined range.

Torsion member 226, consisting of a pair of generally parallel torsion bars or legs 226' and 226", is disposed within tubular arm 214. Legs 226' and 226" are integrally connected at their outer ends and are fixedly and nonrotatably received in the flattened or otherwise deformed end 214'. Dimples 230 aid in maintaining the torsion member so related. The inner end of each bar or leg 226', 226" extends through block 218 and terminates in lateral projections 234' and 234", respectively. Torque is applied to the bars or legs through each projection 234', 234" as before; however, in this instance bar 226' has counterclockwise torque applied thereto while clockwise torque is applied to bar 226". Projections 234' and 234" rest on opposite sides 227 of head 220. Again, it will be understood that when head 220 is received on a pivot shaft, outer end 216 of arm 214 will be resiliently urged toward a windshield in an amount in proportion to the stored torsional energy stored in bars 226' and 226". The capacity of the torsion member 226 depends upon size, design and internal characteristics. It will be understood that the desired resilient pressure of arm 214 at its outer end determines the amount of energy to be stored in torsion member 226.

Head 220 is provided with a splined recess 242 adapted to be operatively received on a splined drum head like 47 as shown in FIGURE 8. Resilient clip 246 is mounted on head 220 and has a cantilevered portion overhanging recess 242 for operative engagement with shoulder 49 on the drum head. Other type retainers known in the art may be employed. As shown in FIGURES 12 and 13, cover 220' for head 220 is adapted to be secured in position thereon by bolts and nuts or other means 248.

The heads of the three species have been shown in their several views without protective cover. Covering for these heads may take the forms as shown in FIGURES 15, 16 and 17. Cover 150 in FIGURE 15 is provided for head 120 of FIGURES 7 and 8; cover 250 in FIG- URE 16 is for head 220 shown in FIGURES 10–12; and cover 50 as shown in FIGURE 17 is for head 20 in FIGURES 1–6. Each cover may be deformed at 51, 151 or 251 into recesses on the respective heads for holding engagement thereon.

Stops are provided in each of the species for prescribing the limits to which the outer arm may tilt or dip with respect to the head. The stops are not normally engaging when the head is mounted on a pivot shaft for operation. In FIGURES 2 through 6, stops 33 are provided at the back of head 20 on opposite sides of lateral extension 34 to limit movement between arm 14 and the head. A stop 133 is formed on one side of head 120 for contacting block 118 to limit relative movement in one direction. In FIGURES 12 and 13 it is evident that arm 214 will abut stop or edge 233 at the front of head 220 to limit movement or dip of the arm.

The specification has disclosed that the pressure available at the outer end of the arms for urging a wiper toward a windshield depends upon the energy stored in the torsion bar. The capacity of each torsion bar depends upon its size, design and characteristics. FIGURE 18 shows structure which may be employed at the outer end of the arm for increasing or decreasing torque stored in the bars. More specifically, by applying the numerals of FIGURES 1–6 as typical, the outer end of torsion bar 26 carries a spur gear 75 affixed thereto. Set screw 77 is rotatably mounted crosswise in tubular arm 14 and with its threads in engagement with the teeth of spur gear 75. Upon rotation of set screw 77 the angular displacement of bar 26 can be varied. A similar arrangement can be used with the other species disclosed. It is anticipated that other means can be devised for varying the torque, all within this general idea including means for adjustment on the lateral projecting portions or the surfaces upon which they bear.

The length of the elongate portion of each torsion bar may be varied depending upon the desired pressure to be supplied by the arm onto the wiper and by the characteristics of the bar itself.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:
1. A windshield wiper arm comprising:
a first section hingedly carrying a second section,
said second section adapted to carry a wiper,
said first section adapted for connection with driving means for moving said second section in a path across a windshield,
and torsion bar means carried by said second section and having an axis of torsion substantially coaxially disposed therewith and operative with said first section to urge said hinged second section in one direction relative to said first section.
2. A windshield wiper arm comprising:
an inner section adapted to be received on a drive means for oscillatory movement and hingedly carrying a wiper-carrying outer section in oscillatory movement,
said hinge adapted to permit movement of the wiper-carrying outer section in a plane toward a windshield,
elongate torque bar means having one portion nonrotatably connected to said outer section and another portion disposed at an angle to said plane and bearing on said inner section at one side of said plane for resiliently urging said outer section in said plane.
3. The structure of claim 2 including means associated therewith for varying the torsional force applied by said bar.
4. A windshield wiper arm comprising:
a head hingedly carrying an elongate outer section, said outer section adapted for carrying a windshield wiper,
said head adapted for operative connection with drive means for moving said outer section and winshield wiper across a windshield,
torsion bar means having an elongate torsional portion disposed generally coextensive with said outer elongate section and having one portion thereof nonrotatably anchored to said elongate outer section,
said torsion bar including a portion radially disposed from said elongate torsion portion and bearing on said head so that torsional energy stored about the axis of torsion of said elongate portion urges a blade-carrying portion of said elongate outer section toward a windshield.
5. A windshield wiper arm comprising:
an inner section adapted to be received on a drive means for oscillatory movement and hingedly carrying a wiper-carrying outer section in oscillatory movement,
said hinge adapted to permit movement of the wiper-carrying outer section in a plane toward a windshield,
torque bar means nonrotatably connected to said outer section and including at least two elongate portions each adapted to have torsional energy stored about their axes upon angular displacement of respective laterally projecting portions which bear against said inner section on opposite sides of said plane whereby reaction thereon urges said wiper-carrying outer section toward said windshield.
6. The structure of claim 5 including means on said inner section for angularly adjusting said wiper-carrying outer section in a plane transverse to said first-mentioned plane.
7. A windshield wiper arm comprising a first section adapted to be connected to a source of power,
a second section adapted to exert pressure on a windshield wiper,
said first and second sections being hingedly connected,
an elongate pressure means operatively associated with said first section and extending longitudinally of said second section and operatively associated therewith whereby movement of either of said sections with relation to the other will induce in said elongate pressure means torsional strains about its axis tending to return said elongate pressure means toward a reduction of torsional forces,
whereby, as a function of stored torsional energy, pressure on said wiper is exerted toward the windshield.
8. A windshield wiper arm comprising a first section adapted to be connected to a source of power,
a second section adapted to exert pressure on a windshield wiper,
said first and second sections being hingedly connected,
pressure means including an elongate body having a torsional axis extending longitudinally of said second section and nonrotatably connected thereto and including a laterally disposed portion operatively associated with said first section whereby movement of either of said sections with relation to the other will induce in said pressure means torsional strains about its axis which tend to return said pressure means toward a reduction of torsional forces,
whereby, as a function of torsion reaction, pressure on said windshield wiper is exerted toward the windshield.
9. A windshield wiper arm comprising:
a pair of hingedly connected sections,
one of said sections being elongate and adapted to carry a windshield wiper and the other section adapted for connection to an actuating shaft,
means for urging said one section relative to the other about said hinged connection, said urging means comprising an elongate bar portion generally disposed about a longitudinal axis and a laterally projecting portion, said elongate portion nonrotatably connected to said one member and said laterally projecting portion bearing against said other section whereby torsional energy stored about the axis of said elongate portion by angular displacement of said laterally projecting portion reacts to urge said one section relative to the other section.

References Cited by the Examiner

UNITED STATES PATENTS

| | | | |
|---|---|---|---|
| Re. 22,244 | 1/43 | Horton | 15—250.35 |
| 2,229,718 | 1/41 | Bramming | 15—250.35 |
| 2,295,620 | 9/42 | Zaiger | 15—250.35 |
| 2,528,283 | 10/50 | Nesson | 15—250.35 |
| 2,660,748 | 12/53 | Gaumer | 15—250.34 |
| 2,885,710 | 5/59 | Brasty | 15—250.34 |

CHARLES A. WILLMUTH, *Primary Examiner.*

UNITED STATES PATENT OFFICE
CERTIFICATE OF CORRECTION

Patent No. 3,178,751                April 20, 1965

Leo J. Wubbe

It is hereby certified that error appears in the above numbered patent requiring correction and that the said Letters Patent should read as corrected below.

Column 3, line 22, after "size," insert -- design, --; column 4, line 24, for "bearing" read -- bearings --; column 6, line 11, for "torsion" read -- torsional --.

Signed and sealed this 5th day of October 1965.

(SEAL)
Attest:

ERNEST W. SWIDER                EDWARD J. BRENNER
Attesting Officer                Commissioner of Patents